(12) United States Patent
Farag

(10) Patent No.: US 8,439,074 B2
(45) Date of Patent: May 14, 2013

(54) PLASTIC CONSTRUCTION FOR DECORATIVE SPOUT

(75) Inventor: Hanna O. Farag, Riverside, CA (US)

(73) Assignee: Price Pfister Holdings Inc., Lake Forest, CA (US)

( * ) Notice: Subject to any disclaimer, the term of this patent is extended or adjusted under 35 U.S.C. 154(b) by 513 days.

(21) Appl. No.: 12/657,975

(22) Filed: Jan. 29, 2010

(65) Prior Publication Data

US 2011/0186163 A1    Aug. 4, 2011

(51) Int. Cl.
*E03C 1/04*     (2006.01)

(52) U.S. Cl.
USPC ............................................. 137/801

(58) Field of Classification Search .............. 137/801; 4/675–678
See application file for complete search history.

(56) References Cited

U.S. PATENT DOCUMENTS

| | | | |
|---|---|---|---|
| 4,649,958 A * | 3/1987 | Purcell | 137/801 |
| 4,717,476 A * | 1/1988 | Scott | 210/266 |
| 4,884,596 A * | 12/1989 | Byers et al. | 137/801 |
| 5,087,514 A * | 2/1992 | Graefe | 428/315.5 |
| 5,131,428 A * | 7/1992 | Bory | 137/606 |
| 5,397,102 A | 3/1995 | Kingman | |
| 5,579,823 A | 12/1996 | Mikol et al. | |
| 6,775,866 B1 * | 8/2004 | Martir et al. | 4/678 |
| 6,817,379 B2 * | 11/2004 | Perla | 4/678 |
| 7,231,936 B2 | 6/2007 | Chang | |
| 7,766,043 B2 * | 8/2010 | Thomas et al. | 137/801 |
| 8,042,203 B2 * | 10/2011 | Lin | 4/678 |
| 2004/0117906 A1 * | 6/2004 | Baker et al. | 4/676 |
| 2007/0271695 A1 * | 11/2007 | Thomas et al. | 4/675 |
| 2009/0078325 A1 | 3/2009 | Lin | |
| 2009/0266433 A1 | 10/2009 | Liang | |

FOREIGN PATENT DOCUMENTS

CN   101109469   1/2008
WO   WO 2009/018753   12/2009

* cited by examiner

*Primary Examiner* — Craig Schneider
(74) *Attorney, Agent, or Firm* — Barnes & Thornburg LLP

(57) ABSTRACT

A faucet spout and method of manufacturing the same in which a layer of structural plastic is injection molded in two or more pieces and joined to form an armature having a waterway through it. A platable plastic layer is overmolded on some or all of the armature to provide a detailed decorative surface that is plated by deposition of a metal or metal alloy coating.

19 Claims, 4 Drawing Sheets

PLASTIC CONSTRUCTION FOR DECORATIVE SPOUT

BACKGROUND OF THE INVENTION

1. Field of the Invention

The present invention relates generally to a method of manufacturing faucets and spouts and the faucets/spouts produced thereby. More specifically, the present invention is directed to a product and process for making structurally non-metallic platable-grade faucets and spouts by multi-layer molding.

2. Description of the Background

Plumbing fixtures including faucets and faucet spouts must meet certain strength requirements to conform to building codes and to stand up to the rigors of everyday consumer use. Conventional faucets and faucet spouts are cast molded from metal or metal alloys and require further grinding and polishing of the cast body that consumes undue time, money and labor. Moreover, the residual metallic powder from grinding and polishing requires cleaning steps and results in waste residue that poses environmental problems. Nevertheless, metallic spouts are prevalent because they generally meet the minimum strength requirements and can be formed and polished or plated to produce a clean, bright appearance that many consumers desire.

Plastic faucet spouts are much less expensive to produce but have in the past suffered from limited strength and durability as well as aesthetic issues. Plastic faucets and spouts are more notoriously difficult to decoratively form or metal plate, so as to produce the fit and finish demanded by the market. Consequently, widespread efforts at merchandising plastic faucets and spouts have been limited and such products are not generally available in the market.

It would be greatly advantageous to provide an economical method of making a non-metallic faucet spout that is structurally sound, decoratively formed, and finished by metallic plating.

BRIEF DESCRIPTION OF THE DRAWINGS

The objects, features, and advantages of the present invention will become apparent from the following detailed description of the preferred embodiments and certain modifications thereof when taken together with the accompanying drawings in which like numbers represent like items throughout and in which.

DETAILED DESCRIPTION OF THE PREFERRED EMBODIMENT

Figure 1:
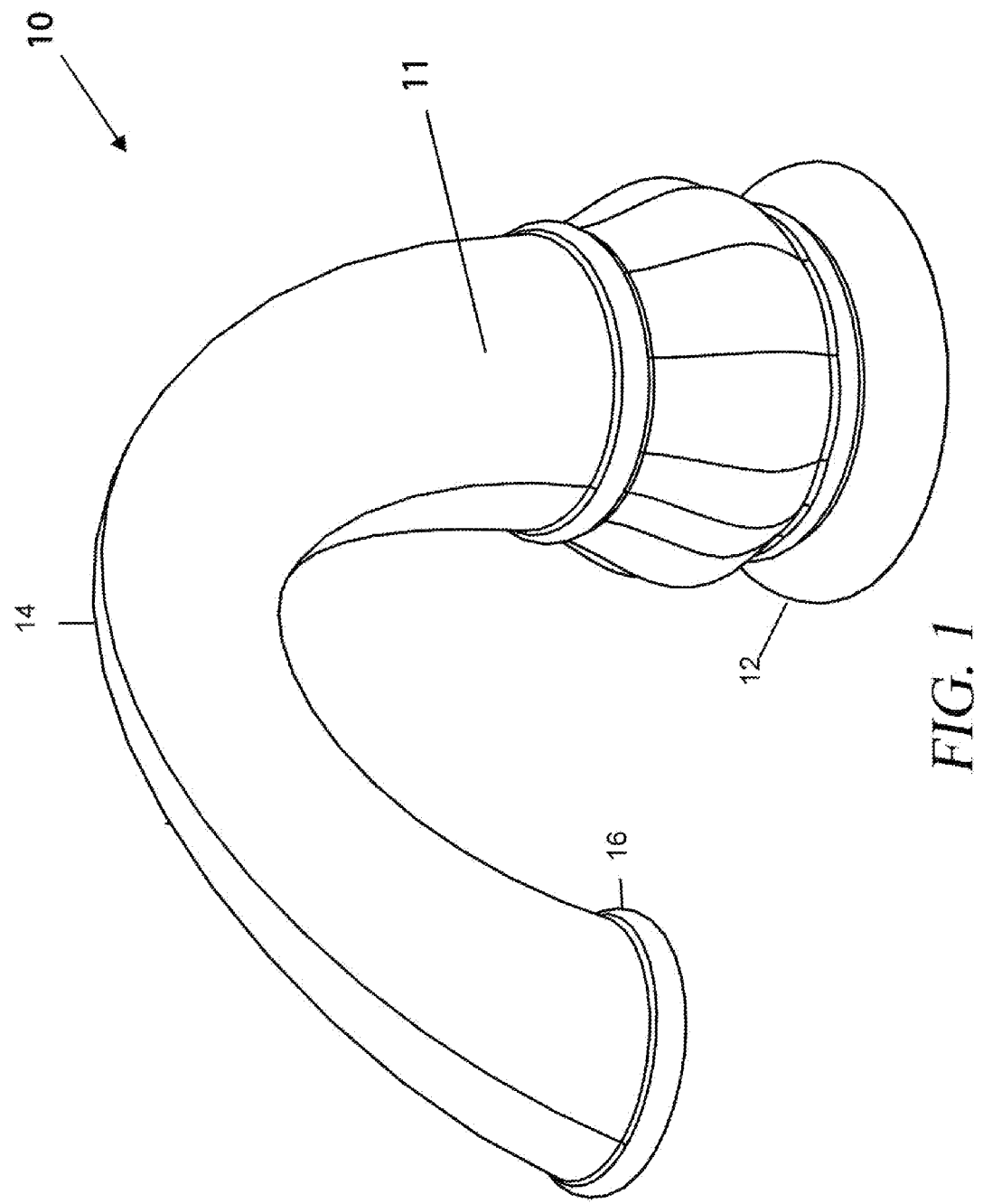
FIG. 1 is a perspective view of a fully manufactured spout 10 according to the present invention.

For the purposes of promoting an understanding of the principles of the invention, reference will now be made to the exemplary embodiment illustrated in the drawings and described below. The embodiment disclosed is not intended to be exhaustive or limit the invention to the precise form disclosed in the following detailed description. Rather, the embodiment is chosen and described so that others skilled in the art may utilize its teachings. It will be understood that no limitation of the scope of the invention is thereby intended. The invention includes any alterations and modifications in the illustrated device, the methods of operation, and further applications of the principles of the invention which would normally occur to one skilled in the art to which the invention relates.

The invention is a faucet spout and method of manufacturing the same utilizing a composite construction that takes advantage of the inherent strengths of certain classes of non-metallic materials while avoiding their limitations.

As seen in FIG. 1, a faucet spout 10 according to one embodiment of the present invention generally extends from a deck mounted base 12, along a gooseneck body 14, to an outlet 16. The exterior of the base 12, body 14 and outlet 16 are formed within an overmold layer 11 that is preferably plated to provide a decorative metallic surface finish, such as nickel, chrome, brass or bronze plating. An inner structural framework including a spout armature 5 (here obscured but described below) provides structural strength.

Figure 2:
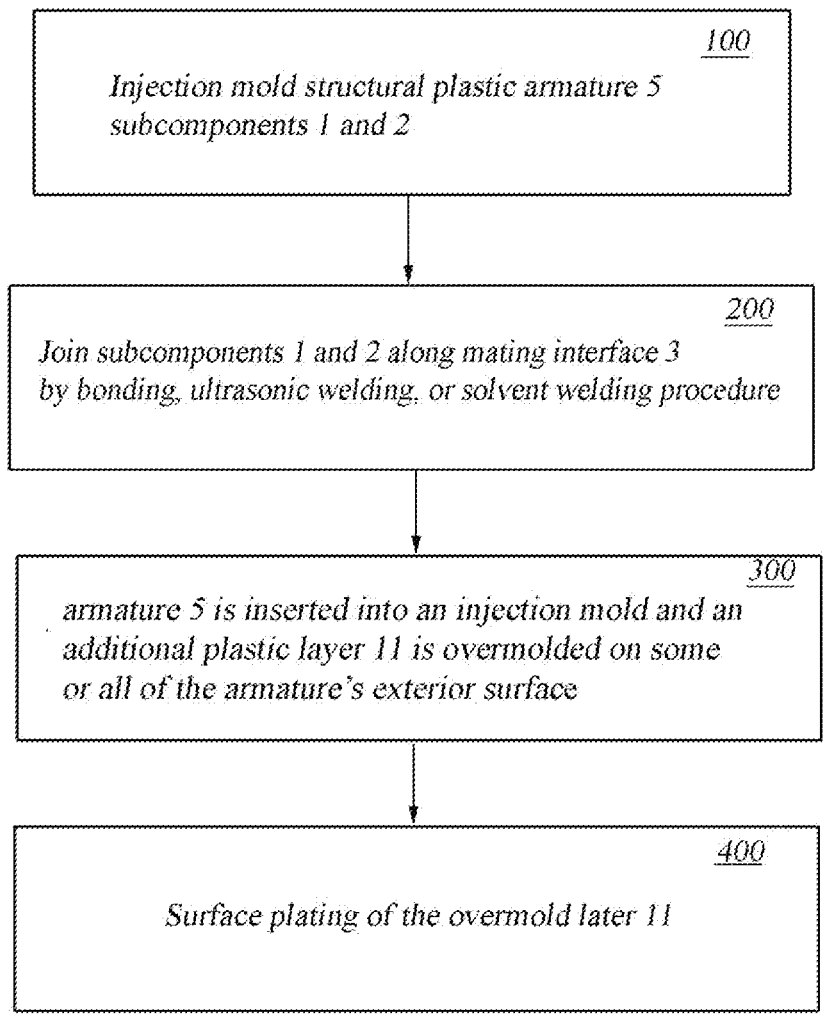
FIG. 2 is a flow chart illustrating the method steps for manufacturing the spout 10 of FIG. 1.
Figure 3:
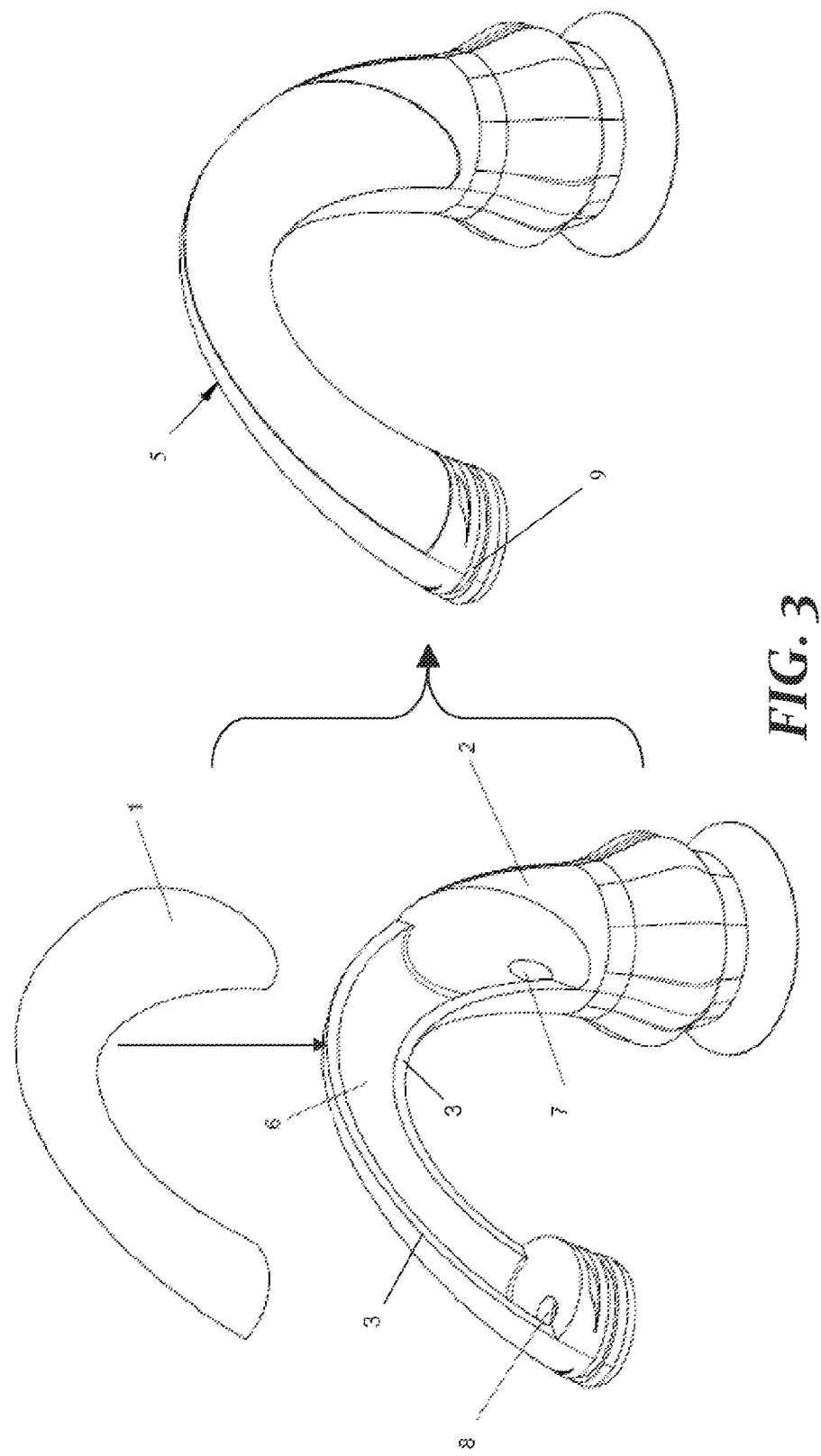
FIG. 3 is an exploded perspective view of a spout subassembly according to the present invention.

FIG. 2 is a flow chart illustrating the method steps for manufacturing the spout 10 of FIG. 1, and FIG. 3 is an exploded perspective assembly view of a spout armature 5 according to the present invention.

With combined reference to FIGS. 2 and 3, a first step 100 in the manufacturing process is the production of pieces of a spout armature 5 by injection molding of a structural plastic, preferably modified polyphenylene oxide (PPO) comprising a blend of PPO polyphenylene ether resin and polystyrene (PS) which is commonly sold under the trade name Noryl®. As depicted in FIG. 3, the armature 5 is made up of at least two separately molded subcomponents 1 and 2. Subcomponents 1 and 2 may be made of the same structural plastic material or differing materials and may contain imbedded metal inserts 14 for enhanced strength where needed or as a means to connect or engage additional elements. Other structural plastics including Polyoxymethylene (Celcon®/Delrin®), Polyetheretherketone (PEEK), Polybutylene terephthalate (PBT), Polyethylene terephthalate (PET), Polyamides (Nylon®), polycarbonate and thermoplastic polyurethane all suitable for contact with potable water may also be used in the construction of the armature 5 subcomponents 1, 2. As illustrated, subcomponent 2 may comprise the bulk of the armature 5 and subcomponent 1 a paneled section extending along the gooseneck body 14. Construction of the armature 5 from more than one subcomponent allows for a much greater scope of shapes for the assembled armature 5 and ultimately of the spout 10. By this method, spouts of any shape formable by traditional metal casting are also achievable in composite plastic layers as described herein.

In a second step 200, subcomponents 1 and 2 are joined to one another at a mating interface 3 as seen ion FIG. 2. Subcomponents 1 and 2 may be bonded by adhesive or sealant or through an ultrasonic welding or solvent welding procedure as known in the industry and as appropriate for the material or materials from which they are constructed. When joined, spout armature 5 provides the basic form of the ultimately desired spout with limited surface detailing. Referring to the sectional view of FIG. 4, the armature 5 in the base section 12 is a substantially solid member having defined waterways. Specifically, the joined subcomponents 1 and 2 of spout armature 5 define a fluid-sealed waterway within the armature 5 extending from a channel 7 through base 12, to a conduit 6 through the gooseneck 14, to an aperture 8 in the outlet 16 for conducting water to the outlet.

One or more surface features 9 including annular rings, annular grooves, ridges, depressions or protrusions may be provided on the external surface of the armature 5 for mechanical engagement with the overmold layer 11, as described below.

Figure 4:
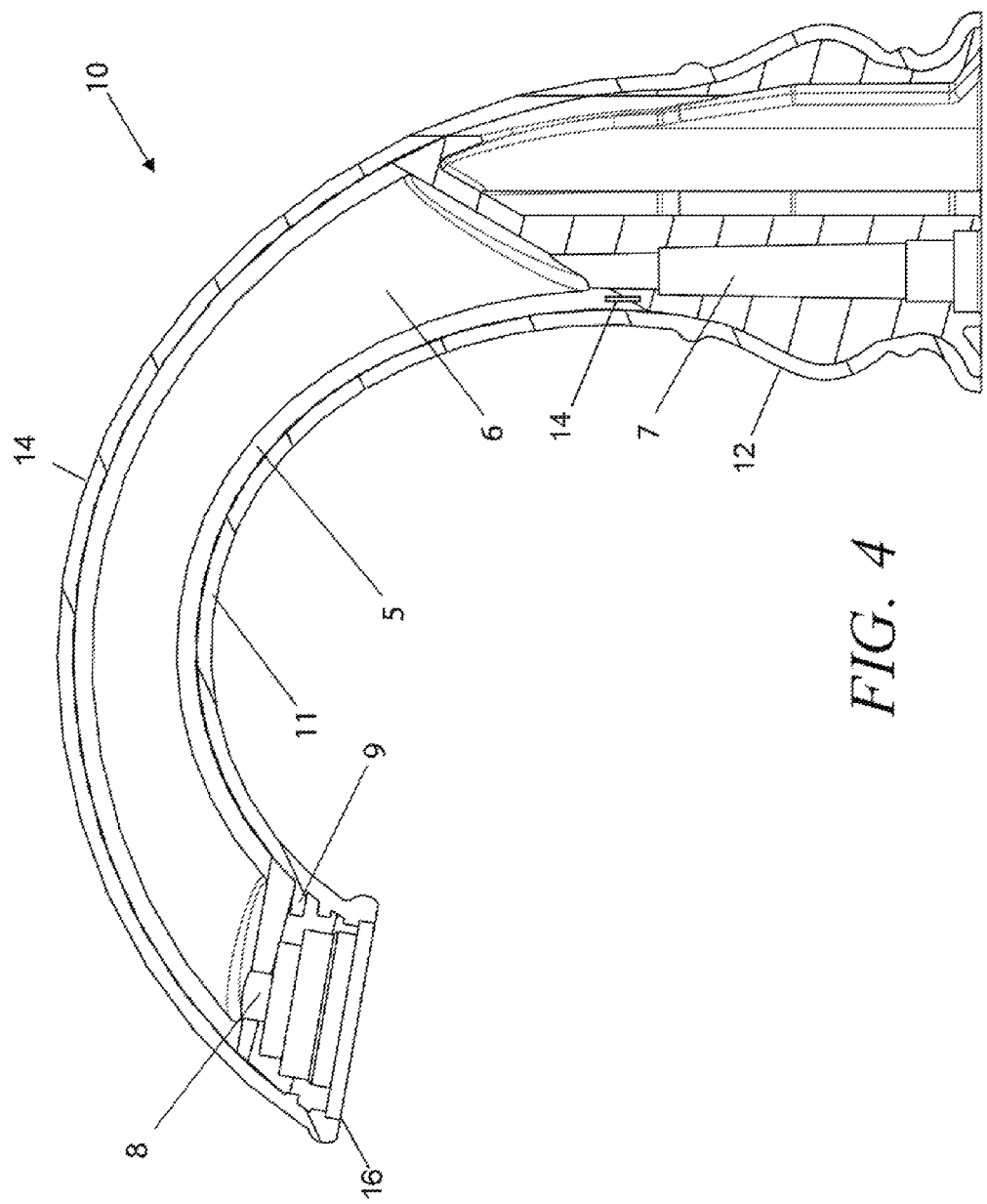
FIG. 4 is a sectional view of a spout according to the present invention.

In a third step 300, the armature 5 is inserted into an injection mold and an additional plastic layer (the overmold layer 11) is overmolded on some or all of the armature's exterior surface, as seen in FIGS. 1 and 4. Injection molds are utilized that allow the previously molded armature 5 to be reinserted to allow a new plastic layer to form around it. If desired, conventional two-shot or multi-shot molds may be designed for this to overmold the armature 5 within a single molding cycle in which the armature subcomponents 1, 2 are molded into their basic shapes and are bonded at step 200, and then the overmolded layer 11 is injection-molded into remaining open spaces.

The overmolded layer 11 is made from a plateable plastic material, preferably from acrylonitrile butadiene styrene (ABS), and may be chemically or mechanically bonded to the armature 5. The afore referenced surface features 9 enable mechanical bonding of the armature 5 and overmold layer 11 by providing points of tongue-in groove engagement for the thermoform or thermoset overmold material before curing or setting in the form. The ultimate surface shape, properties and aesthetic appearance of the faucet spout 10 is provided by the overmolded layer 11 which is subsequently plated to provide a decorative surface finish at step 400.

At step 400, surface plating of the overmold layer 11 is the final step in the process and may be conducted according to known methods of metal plating surfaces including electroless plating of nickel, nickel alloys, or other metal alloys. Faucet spout 10 is thus provided with the internal structure of the armature 5 including the waterway 6, inlet end 7, and outlet end 8 made of a structural plastic as well as the decorative surface detail and metal finish that is possible when using non-structural plateable plastics in the overmolding layer 11. Other plateable plastics including Acrylonitrile Butadiene Styrene/Polycarbonate Alloy (ABS/PC), polypropylene (PP), Polyphenylene sulfide (PPS) and Polyphthalamide (PPA) may also be used in the construction of the overmolded layer 11.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims and may be used with a variety of materials and components. This application is therefore intended to cover any variations, uses, or adaptations of the invention using its general principles. Further, this application is intended to cover such departures from the present disclosure as come within known or customary practice in the art to which this invention pertains.

I claim:

1. A method of making a faucet spout comprising the steps of:
   forming a first portion of a spout armature by injection molding of a structural plastic;
   forming separately from said first portion a second portion of a spout armature by injection molding of a structural plastic;
   after completion of said forming steps, joining said first portion and said second portion to form a unitary single-layer spout armature comprising an inlet end and an outlet end and defining a waterway connecting said inlet end with said outlet end;
   forming by injection molding of a platable plastic an overmold layer about said unitary spout armature;
   plating said overmold layer with a metal or metal alloy.

2. The method of making a faucet spout of claim 1 wherein said structural plastic is selected from the group consisting of modified polyphenylene oxide, polyoxymethylene, polyetheretherketone, polybutylene terephthalate, polyethylene terephthalate and Polyamides.

3. The method of making a faucet spout of claim 1 wherein said platable plastic is chosen from the group consisting of acrylonitrile butadiene styrene, acrylonitrile butadiene styrene-polycarbonate alloy, polypropylene, polyphenylene sulfide and polyphthalamide.

4. The method of making a faucet spout of claim 1 wherein said step of forming said first portion further comprises forming said first portion of said spout armature by injection molding of a structural plastic while imbedding within said first portion at least one metallic insert for enhanced strength.

5. The method of making a faucet spout of claim 1 wherein said step of joining said first portion and said second portion to form said unitary spout armature further comprises solvent welding said first portion to said second portion.

6. The method of making a faucet spout of claim 1 wherein said step of joining said first portion and said second portion to form said unitary spout armature further comprises ultrasonic welding said first portion to said second portion.

7. The method of making a faucet spout of claim 1 wherein said step of joining said first portion and said second portion to form said unitary spout armature further comprises bonding said first portion to said second portion by adhesive or sealant.

8. A faucet spout comprising a unitary spout armature comprising an inlet end and an outlet end and a defined waterway connecting said inlet end with said outlet end, an injection molded overmold layer about said unitary spout armature, and a metallic plating about said overmold layer, said faucet spout being formed by a process comprising the steps of:
   forming a first portion of said unitary spout armature by injection molding of a structural plastic, and
   separately forming a second portion of said unitary spout armature by injection molding of a structural plastic;
   joining said first portion and said second portion to form said unitary spout armature;
   forming a plastic overmold layer about said unitary spout armature by injection molding of a platable plastic; and
   plating said overmold layer with a metal or metal alloy.

9. The faucet spout of claim 8 wherein said armature further comprises surface features for mechanical engagement with said overmold layer.

10. The faucet spout of claim 8 wherein said structural plastic is selected from the group consisting of modified polyphenylene oxide, polyoxymethylene, polyetheretherketone, polybutylene terephthalate, polyethylene terephthalate and Polyamides.

11. The faucet spout of claim 8 wherein said platable plastic is chosen from the group consisting of acrylonitrile butadiene styrene, acrylonitrile butadiene styrene-polycarbonate alloy, polypropylene, polyphenylene sulfide and polyphthalamide.

12. The faucet spout of claim 8 wherein said step of joining at least said first portion and said second portion to form said armature further comprises solvent welding said first portion to said second portion.

13. The faucet spout of claim 8 wherein said step of joining at least said first portion and said second portion to form said armature further comprises ultrasonic welding said first portion to said second portion.

14. The faucet spout of claim 8 wherein said step of joining at least said first portion and said second portion to form said armature further comprises bonding said first portion to said second portion by adhesive or sealant.

15. A faucet spout comprising
a first layer of structural plastic comprising
   a first injection molded portion having a first mating surface and a second mating surface and
   a second injection molded portion cooperatively formed with a third mating surface and a fourth mating surface,
   said first mating surface sealingly joined to said third mating surface and said second mating surface sealingly joined fourth mating surface to form an armature of single layer construction comprising an inlet end and an outlet end and having a waterway fluidly connecting said inlet end with said outlet end;
   a second layer of a platable plastic overmolded on at least a portion of an external surface of said armature;
   a layer of deposited metal plating on an external surface of said overmold layer.

16. The faucet spout of claim 15 wherein said first layer further comprises surface features for mechanical engagement with said second layer.

17. The faucet spout of claim 15 wherein said structural plastic is selected from the group consisting of modified polyphenylene oxide, polyoxymethylene, polyetheretherketone, polybutylene terephthalate, polyethylene terephthalate and Polyamides.

18. The faucet spout of claim 15 wherein said platable plastic is chosen from the group consisting of acrylonitrile butadiene styrene, acrylonitrile butadiene styrene-polycarbonate alloy, polypropylene, polyphenylene sulfide and polyphthalamide.

19. The faucet spout of claim 15 further comprising at least one metallic insert integrally molded into said a first layer of structural plastic.

* * * * *